Patented Feb. 20, 1951

2,542,544

UNITED STATES PATENT OFFICE 2,542,544

PROCESS OF PRODUCING POLYARYL METHANE DYES OF THE ROSANILINE TYPE

Serge A. Loukomsky, Bound Brook, and Guy S. Herrick, Middlesex, N. J., assignors to American Cyanamid Company, New York, N. Y., a corporation of Maine No Drawing. Application June 14, 1948, Serial No. 32,988

5 Claims. (Cl. 260—391)

This invention relates to a process of producing triarylmethane dyestuffs. More specifically, the invention relates to an improved process of catalytically oxidizing leuco triarylmethane dyes using gaseous oxygen or mixtures thereof, such as air.

Many triarylmethane dyes, for example, those of the rosaniline type, are commercially made by condensing mixtures of methylated aryl amines and aryl amines in the presence of oxidizing agents. Sometimes the leuco form is obtained as an intermediate product and oxidized to the final dye in a separate step. In other cases the leuco form is not isolated and the oxidation is carried to the dyestuff form directly. Originally, the oxidation was effected with commercial oxidants such as arsenic acids. However, this process was eventually superseded by one using mononitrobenzene because of the practical impossibility of freeing the dyestuffs from traces of arsenic.

The processes using commercial oxidants were, of course, batch processes and required a number of steps in separating the dye from the reaction mixture. Side reactions also resulted which made the method distinctly unattractive.

About twenty years ago, an attempt was made to oxidize continuously certain triarylmethane leuco bases, notably those prepared from secondary polyaryl amines. In this process air or other oxygen containing gases were bubbled through a reaction mixture containing the leuco product in the presence of a large amount of a solvent such as aqueous alcohol, acetone or ethyl acetate. This process was theoretically attractive as it avoided some of the side reactions and disadvantages of the process using commercial oxidizer, but the yields obtained did not result in the adoption of these methods by industry.

The reaction products of the present invention are much less contaminated with by-products making the final purification of the dyestuff easier and resulting in higher yields.

The process of this invention depends on the use of gaseous oxygen and a vanadium catalyst in conjunction with a reaction mixture in which the polyphenylmethane derivatives are associated with an excess of the amines used in the production of the polyphenylmethane compound.

While the various vanadium catalysts and vanadates may all be used as oxidation catalysts, very superior results are obtained with two particular catalysts with which the preferred form of the present invention deals.

The best catalyst is obtained by reducing sodium metavanadate with acetic anhydride. The exact composition of the vanadium compound has not been completely determined. It contains considerable amount of tetravalent vanadium. Ammonium metavanadate may also be used and while better than other vanadium compounds such as vanadium pentoxide it is somewhat inferior to the reduced sodium metavanadate.

It is an advantage of the present invention that the process may be carried out continuously, removing the oxidized reaction mixture and making up used amine by the addition of fresh reactants. Because of its economies in large scale commercial production such a continuous process is preferred. However, the improvements obtained with the better catalytic oxidation process of the present invention are also enjoyed when the process is performed as a batch operation. Either modification is included within the present invention. The high purity and increased yield of dyestuff is obtained in each case, but the batch process, of course, does not have the manipulative economy which is possible in the continuous process.

All the reactants may be introduced into the reaction vessel separately, but preferably in the case of aniline, they are permitted to react to form anhydroformaldehyde aniline which is then introduced into the reaction vessel with the conventional condensation agent, hydrochloric acid.

The process is generally applicable to triarylmethane dyestuffs of the rosaniline type, the particular product depending on the amine with which one starts. Thus, for example, fuchsine is obtained when aniline and anhydroformaldehyde aniline are used, the intermediate diamino phenylmethane being oxidized by the air and vanadium catalyst. In a similar manner the compounds toluidine, the xylidines, alkylated amines such as amino and dimethyl aniline or derivatives may be used. The general applicability of the process to various dyes of the rosaniline type constitutes one of its practical advantages.

The amount of excess amine is not critical, but it should be sufficiently large so that the reaction mixture is readily stirrable and a good contact is presented between the leuco diamino diarylmethane, the amine, the oxidizing excess and the vanadium catalyst.

Since one of the advantages of the present invention lies in the high purity of the dyestuff recovered, it is important to use pure amines, particularly those which are free from iron because the latter while also being an oxidation catalyst directs the reaction to the formation of a large excess of by-products.

The vanadium catalyst of the present invention should not be confused with metallic catalysts which have been used in the past in connection with the condensation of the amines with formaldehyde to form the leuco base. Thus, for example, halides of copper have been used for this purpose. These are not used as oxidation catalysts which is the function performed by the vanadium compounds used in the present invention, but are used as chemical oxidizers and hence at least stoichiometrical proportions. When used as catalysts these compounds produce a very impure product.

Anhydrous reagents are required and the reaction should be carried out under conditions which result in the removal of water which may be formed. Unless adequate water removal is obtained, the advantages of the present invention are not fully realized.

The present invention will be described in greater detail in conjunction with the following examples. Parts are by weight.

EXAMPLE 1

Preparation of the catalyst

Stoichiometrical equivalents of sodium hydroxide are added to a solution of ammonium metavanadate and the mixture boiled to dryness. The sodium metavanadate thus formed was then added to acetic anhydride in amounts approximately ten times that of the sodium metavanadate. The resulting slurry is stirred and heated to 100-105° C., a brown solution being gradually produced which reacts violently with the acetic anhydride. Finally, a gray precipitate is formed and is added to from five to ten times its volume of aniline.

EXAMPLE 2

20 parts of iron free anhydroformaldehyde aniline are slurried in 150 parts of aniline and 6 parts of 23° Bé hydrochloric acid. After stirring for some time an additional 64 parts of hydrochloric acid are added and the reaction mixture maintained at 70° C. overnight. The temperature is then raised to 130° C. with stirring, the vapors being allowed to escape, and after about 5 hours 200 parts of aniline are added and the temperature brought down to 100-105° C.

0.15 part of the catalyst prepared as described in Example 1 is added and the reaction mixture aerated at 105°-110° C. for from 15 to 17 hours using dry air and maintaining thorough but not excessive agitation.

The oxidized dyestuff in the form of its hydrochloride is then recovered in the usual manner, involving the steam stripping of the excess of amine under controlled pH conditions, collecting fractions of the dyestuff soluble at different pH values, precipitating the base and collecting by filtration.

EXAMPLE 3

The procedure of Example 2 substituting ammonium metavanadate for the catalyst described in Example 1. A good yield of oxidizing dyestuff is obtained, but does not approach the theoretical as closely as when the preferred catalyst is used. The quality of the product is also slightly inferior.

EXAMPLE 4

A mixture of 300 parts aniline and 70 cc. of concentrated C. P. hydrochloric acid is heated to 135-140° C. After dehydration, the temperature is lowered to 100° C. and 20.5 parts of para toluidine added. 0.15 part of the vanadium catalyst is prepared as described in Example 1 and washed into the charge with 16 parts of aniline. The temperature of the charge is kept at 110-118° C. and air introduced through an Ace dispersion tube. Oxidation is stopped after 24 hrs. and the melt is steam stripped, extracted with dilute hydrochloric acid, and the product salted out. A very crystalline fuchsine is obtained.

EXAMPLE 5

A mixture of 300 parts aniline and 70 cc. of concentrated C. P. hydrochloric acid is heated to 135-140° C. After dehydration, the temperature is lowered to 100° C. and 23 parts of m-xylidine added. 0.15 part of the vanadium catalyst is prepared as described in Example 1 and washed into the charge with 16 parts of aniline. The temperature of the charge is kept at 110-118° C. and air introduced through an Ace dispersion tube. Oxidation is stopped after 24 hours and the melt is steam stripped, extracted with dilute hydrochloric acid, and the product salted out. A very crystalline fuchsine is obtained.

EXAMPLE 6

12 parts of leuco para fuchsine are slurried in 300 parts of aniline and 60 parts of hydrochloric acid. This mixture is dehydrated by heating at 140° C. for 4 hours. The temperature is then lowered to 110° C. and 0.1 part of catalyst is added. With mild agitation, dry air is bubbled through the charge by means of a porous gas dispersion tube at such a rate that a fine layer of foam covers the charge. The temperature is maintained at 110-112° C. until color formation reaches a maximum (about 24 hours). The charge is then steam-distilled to remove excess aniline and the para-fuchsine extracted from the stripped material in the usual manner.

We claim:

1. A process of producing polyamino polyarylmethane dyestuffs of the rosaniline type which comprises oxidizing a dispersion of the leuco triamino triarylmethane in excess aryl amine by gaseous oxygen in the presence of a catalyst selected from the group consisting of ammonium metavanadate and the reaction product obtained by heating sodium metavanadate and acetic anhydride to a temperature above 100° C.

2. A process of producing polyamino polyarylmethane dyestuffs of the rosaniline type which comprises oxidizing a dispersion of diamino diarylmethane in excess aryl amine by gaseous oxygen in the presence of a catalyst selected from the group consisting of ammonium metavanadate and the reaction product obtained by heating sodium metavanadate and acetic anhydride to a temperature above 100° C.

3. A process according to claim 2 in which the aryl amine is aniline and the diamino diarylmethane is p-diamino diphenylmethane.

4. A continuous process according to claim 3 in which the diamino diarylmethane is prepared in the reaction mixture by reacting anhydroformaldehyde aniline with an excess of aniline in the presence of a condensing agent.

5. A method according to claim 1 in which the leuco dyestuff is leuco para fuchsine.

SERGE A. LOUKOMSKY.
GUY S. HERRICK.

REFERENCES CITED

The following references are of record in the file of this patent:

UNITED STATES PATENTS

| Number | Name | Date |
|---|---|---|
| 471,638 | Homolka | Mar. 29, 1892 |
| 1,694,057 | Cole | Dec. 4, 1928 |
| 1,805,925 | Schmidt | May 19, 1931 |

OTHER REFERENCES

Ephraim, "Inorganic Chemistry," (4th ed. 1943, revised by Thorne et al.), pp. 493-495.